United States Patent [19]
Schumann et al.

[11] Patent Number: 5,826,521
[45] Date of Patent: Oct. 27, 1998

[54] METHOD FOR REDUCING THE EMISSIONS PRODUCED BY INCINERATING WASTE

[75] Inventors: Bernd Schumann; Matthias Teller, both of Berlin; Herbert März, Fellbach, all of Germany

[73] Assignee: SBW Sonderabfallentsorgung Badenwurttemberg GmbH, Fellbach, Germany

[21] Appl. No.: 532,580

[22] PCT Filed: Apr. 9, 1994

[86] PCT No.: PCT/EP94/01101

§ 371 Date: Dec. 6, 1995

§ 102(e) Date: Dec. 6, 1995

[87] PCT Pub. No.: WO94/24484

PCT Pub. Date: Oct. 27, 1994

[30] Foreign Application Priority Data

Apr. 22, 1993 [DE] Germany ............................ 43 13 102.6

[51] Int. Cl.⁶ ....................................................... F23J 11/00
[52] U.S. Cl. .......................... 110/345; 110/205; 110/229; 110/346
[58] Field of Search ................................... 110/204, 205, 110/229, 246, 345, 346

[56] References Cited

U.S. PATENT DOCUMENTS

| | | | |
|---|---|---|---|
| 4,900,401 | 2/1990 | Horton | 110/229 |
| 4,961,391 | 10/1990 | Mok et al. | 110/246 |
| 5,179,903 | 1/1993 | Abboud et al. | 110/345 |
| 5,309,850 | 5/1994 | Downs et al. | 110/235 |

FOREIGN PATENT DOCUMENTS

| | | |
|---|---|---|
| 0 495 766 A2 | 7/1992 | European Pat. Off. . |
| 40 26 245 A1 | 2/1992 | Germany . |
| 42 18 628 A1 | 3/1993 | Germany . |
| 53-48079 | 5/1978 | Japan . |

OTHER PUBLICATIONS

Patent Abstracts of Japan, Combustion of Powdered Coal, JP 59 024 115, Tanaka Riyouichi, vol. 8, No. 116 (M–299) 30 May 1984.

*Primary Examiner*—Noah P. Kamen
*Attorney, Agent, or Firm*—Jones, Tullar & Cooper, P.C.

[57] ABSTRACT

A method and installation for reducing emissions during the incinerating of waste results from a combustion chamber, a return situated downstream of the combustion chamber for returning a portion of a flue gas to the combustion chamber in a continuous cycle and a flue gas purification installation; and from situating the flue gas purification installation between the combustion chamber and the return, removing chlorine, heavy metal and sulfur dioxide from the flue gas produced in the flue gas purification installation, and admixing the oxygen required for combustion as pure oxygen with the flue gas to generate synthetic air in the ratio of 4:1 to 1:1, and preferably 2:1 to 1.5:1 while excluding ambient air.

15 Claims, 2 Drawing Sheets

METHOD FOR REDUCING THE EMISSIONS PRODUCED BY INCINERATING WASTE

BACKGROUND OF THE INVENTION

The present invention relates to a method for reducing emissions during the incineration of waste in an incinerator installation, wherein a portion of the flue gas being produced in the course of incineration is returned to the inlet of the incineration installation in a continuous cycle, wherein the oxygen required for combustion is admixed as pure oxygen to the returned flue gas for generating synthetic air composed of flue gas and pure oxygen, wherein the ratio of flue gas and oxygen is 4:1 to 1:1, preferably 2:1 to 1.5:1, and wherein the combination takes place while excluding the ambient air and wherein further flue gas purification is performed in a flue gas purification installation.

Such a method is known from U.S. Pat. No. 5,179,903. In the process disclosed there is an increase in the concentration of chlorine, heavy metals and sulfur dioxide inside the flue gas cycle, which includes a first combustion zone (1), a second combustion zone (2), a cooling zone (3), a solids separation zone (4), a blower (30), a zone for generating synthetic air (5) and a heat exchanger (33).

In view of the large proportion of flue gas circulating in the cycle with respect to the total amount of flue gas being generated, namely one-fifth to one-half, this increase in the concentration after the start-up phase is considerable and also leads to a considerable increase in the concentration of chlorine, heavy metals and sulfur dioxide in the portion of the flue gas which is exhausted to the ambient air via a purification installation (wet gas scrubbing zone (6)) and a further purification zone (7). It is necessary to embody the purification installation (6) correspondingly large to prevent the emission of the increased concentrations.

Furthermore, the upgrade of these components in the flue gas cycle leads to damage to the metal parts thereof. In addition, there is the danger of an escape of these components through not completely sealed places in the cycle.

Such a method is also known from DE 40 26 245 A1. This method is based in principle on employing "pure oxygen without dilution" (see col. 1, line 58; col. 3, lines 47/48, and claim 1) in order to achieve a considerable reduction of the volume for which the installation must be designed, but it mentions that "for preventing overheating" and when needed, cooled waste gas is returned again into the combustion chamber and the oxygen is diluted with it (col. 2, lines 43/44 and 50/51). It is also mentioned that the use of pure oxygen, with or without dilution, prevents the generation of nitrogen oxide and other emissions (col. 1, lines 51/52 and col. 2, line 9/10). Because of the statement in this publication, that the waste gas return is to take place only "as needed" and to prevent overheating of the installation, but that on the other hand a scaling down of the installation is sought by using pure oxygen "without inerts", it is to be assumed that the admixture of returned flue gas takes place only in small amounts and not continuously. This can also be inferred from the fact that the temperatures of 1600° C. (col. 4, line 57) cited in this publication are relatively high.

It is disadvantageous with respect to this known method that, if ever a cycle and/or a return of a not inconsiderable portion of the waste gas is to take place, an enrichment with noxious materials being created during combustion in a revolving cylinder will take place in the cycle, which can result in corrosion of the installation and also requires a larger layout of the downstream flue gas purification installation. Finally, as already indicated above, the use of pure oxygen, even with the admixture of cooled flue gas "if required", leads to increased temperatures in the revolving cylinder and therefore is not suitable for retrofitting existing combustion installations which actually operate with ambient air.

In general, it is of great importance when incinerating waste (household waste and special waste) to reduce the portions of noxious material in the flue gas. In this connection a distinction is made between primary measures intended to reduce the generation of noxious materials, and secondary measures relating to the removal of noxious materials from the flue gases generated when incinerating the waste materials. Sulfur removal, dust removal and nitrogen removal, if required also the removal of halogen compounds and heavy metals, essentially are among the secondary measures. Flue gas purification installations are used for this, which are connected downstream of the combustion installations, whether they are waste incineration installations or power plant heating installations.

The primary measures, i.e. measures for preventing the generation of noxious materials, become increasingly important for keeping within the increasingly stricter threshold limit regulations and for reducing the outlays for the secondary measures. These consist, for example, in preventing the generation of dust in the combustion guides and in the reduction of sulfur-containing noxious materials when selecting the fuels.

Considerable efforts are made for the purpose of reducing the $NO_x$ emissions. Seven different nitrogen oxides are known, of which nitrogen monoxide (NO) and nitrogen dioxide ($NO_2$) are the most stable and therefore essentially constitute the nitrogen oxide burden in the flue gas. Nitrogen monoxide is mainly generated when the combustion gases spend in the combustion chamber at high temperatures and with sufficient air, but without a chemical reaction with the fuel. Since the combustion air consists of 78% nitrogen and 21% oxygen, the nitrogen oxides formed from the nitrogen in the air possibly constitute the largest portion of the noxious material burden. Depending on the fuel and type of combustion, between 500 and 2000 mg of nitrogen oxides are generated per $m^3$ of flue gas. In connection with waste incineration installations of a capacity of 100,000 tons of waste per year, approximately 860 million standard cubic meters ($Nm^3$) of flue gas are produced, with special waste incineration installations of a capacity of 50,000 tons per year approximately 430 million $Nm^3$ of flue gas are produced.

The further development of the primary measures is also important, because the removal of nitrogen from flue gases is performed by means of catalytic reduction with ammonia gas at high temperatures (200° to 250° C.), for one, and also in order to save the catalyzer sulfur and dust are removed. For this purpose, it is necessary to reheat the flue gas, which had been cooled in the sulfur removal installation, with a large energy expenditure.

Another option for preventing the generation of nitrogen oxide is the so-called pulsing combustion with an excess of air. In the course of this, the combustion air is provided in pulses (pulsing) by oscillation generators, so that the fuel and the combustion air are optimally mixed. In this way and for thermodynamic and kinetic reasons the nitrogen oxide generation is reduced to the greatest extent, however, with the prerequisite that suitable frequencies and amplitudes are employed (see N. Awerbuch, "Verhinderung der $NO_x$-Bildung durch pulsierende Verbrennungsluft" [Prevention of $NO_x$ Generation by Pulsating Combustion Air], Verfahrenstechnik 26 (1992), no. 12, and 27 (1993), no. 3). However, these methods are very expensive and not suitable for all materials.

SUMMARY OF THE INVENTION

It is therefore an object of the present invention to provide a method and a device for reducing emissions when incinerating waste, wherein the emissions in the waste air which reach the atmosphere are further reduced. In this case it is intended in particular to employ conventional revolving cylinder installations, i.e. because of the use of pure oxygen temperatures are not to be generated which are incompatible with the present outlay of these installations. On the other hand, it is intended to drastically reduce the generation of emissions, in particular of nitrogen oxides. This is also achieved in such a way that existing prior installations can be retrofitted.

In accordance with the present invention, this object is attained in that the purification of the flue gas to remove chlorine, heavy metals and sulfur dioxide is performed in the cycle.

By placing the portion of the method in which the removal of chlorine, heavy metal and sulfur dioxide is performed, in the flue gas cycle, an increase in the concentration of these noxious portions in the cycle is prevented. Because of this the proportion of these components in the flue gas, which are generated by the incineration of the waste in the incineration installation, is already reduced so drastically that the final purification of the portion of the flue gas which is emitted into the atmosphere can be designed to be very much smaller and at the same time is very much more effective, if not even completely superfluous. In addition, corrosion of the installation areas in which the flue gas is circulated is prevented. The return of the flue gas to the inlet of the combustion installation takes place in a continuous cycle, that the flue gas purification installation is embodied in two steps and the return of the flue gas takes place following purification in the first stage of the flue gas purification installation, and the ratio of flue gas and oxygen in the synthetic air generated by mixing flue gas and pure oxygen which is added in the front part of the combustion installation lies between 4:1 and 1:1, preferably at a ratio of between 1.5:1 and 2:1.

The portion of the nitrogen oxides in the flue gas which, in conventional installations operate with air is to be attributed to the thermal $NO_x$ generation, is drastically reduced and possibly brought down to zero by means of the method of the present invention. In this way it is possible in the extreme case to even reduce the total nitrogen oxide content of the flue gas sufficiently far, because it initially falls below the threshold values prescribed by law, so that a nitrogen oxide removal installation is no longer needed.

Mixing flue gas ($Co_2$) with pure oxygen results in a "synthetic air", in which nitrogen is no longer contained, so that no nitrogen oxides can be generated by the combustion itself, in particular if protective devices are provided at the ends of a revolving cylinder constituting the combustion installation, which are supplied with flue gas as a protective gas against the aspiration of secondary air.

However, the method in accordance with the present invention and a device operating in accordance with it not only reduce the production of nitrogen oxides, but the production of all emissions as a whole, since a large proportion of the flue gas, and therefore a corresponding high proportion of the noxious materials generated during combustion, does not reach the atmosphere and instead reaches the flue gas return and therefore remains in the flue gas cycle. It is therefore a particular characteristic of the method that altogether—in relation to a defined volume of waste to be incinerated—only a portion of the waste gas gets into the atmosphere, namely to the extent it is not returned in the cycle. Therefore only an amount of flue gas reaches the stack which is generated by the oxidation of the special waste by means of the oxygen contained in the combustion gas. The remaining amount of flue gas continuously flows in the cycle. This has the additional advantage that as a whole all noxious materials are reduced by up to 80%. In this way the amounts of nitrogen oxide are drastically reduced and the flue gas volume leaving the installation is simultaneously reduced by up to 80%.

This is to be made clear by the following numerical example: in a special waste incineration installation provided with a waste gas return in accordance with the present invention, the steam production lies around 24 t/h, if approximately 4 t/h of waste with an average heating value of 15 MJ/kg are burned. The steam is generated at a pressure of approximately 32 bar and at a temperature of approximately 350° C. Although, for reasons of heat transfer approximately 20,000 to 40,000 $Nm^3/h$ of $CO_2$-containing cycle gas are circulating, an amount of not more than 6000 to 7000 $Nm^3$ reaches the environment through the stack as surplus gas. Because of the high volumetric heat capacity of the $CO_2$-rich combustion gas, the heat flow densities can be increased from 150 $kW/m^3$ to 200 to 300 $kW/m^3$, depending on the revolving cylinder design.

So that no increase in the concentration or enrichment of the emissions takes place in the flue gas cycle, a further characteristic of the present invention consists in providing the first stage of the flue gas purification installation within the cycle, which is in particular designed in such a way that dust, chlorine, heavy metals and sulfur dioxide are removed from the flue gas. The second stage of the flue gas purification installation through which the flue gas component which is not returned to the cycle passes, is then used for the removal of dioxins, furanes and furthermore for the removing the remainder of sulfur dioxide, heavy metals and—to the extent still required—of nitrogen oxides. This division of the flue gas purification installation into two stages and the inclusion of the first stage into the continuous flue gas cycle results in that an enrichment of the cycle with noxious materials is prevented. The demands made on this first stage of the flue gas purification installation are not as severe, to the extent that the "remainder" of the flue gas leaving the first stage is cleaned in the second stage—if required—completely down to the critical threshold values.

In this case the ratio of flue gas ($CO_2$) to oxygen is recited as between 4:1 and 1:1. A particularly preferred range is between 2:1 to 1.5:1. For affecting the flame temperature as well as to optimize the entire combustion process, the ratios of the amounts are controlled by adaptation to the various materials which are incinerated.

An advantageous development of the present invention provides that the regulation of the combustion process takes place by the addition of fluid support energy carriers, in particular purified pyrolysis gas and pyrolysis oil generated by upstream pyrolysis. Portions of waste rich in heat values are removed from the special waste prior to incineration. The flue gas volume is reduced by this. A further advantage lies in that dangerous toxic materials, such as PCB, dioxins, furanes, etc. as well as nitrogen-containing substances are destroyed. Thus the $NO_x$ generation is further reduced in this way.

The oxygen is advantageously generated in an air separation plant with the help of the process energy created by the combustion. In the course of air separation, besides oxygen, nitrogen is essentially also obtained, which can be used as a protective gas during the comminution of the special waste taking place prior to incineration or pyrolysis.

An additional energy recycling effect is obtained if the pyrolysis taking place upstream is provided with waste rich in heat values, in particular in the form of waste similar to special waste, such as plastic waste or car tires. If the amount of waste to be pyrolyzed is at least 20 to 25% of the waste to be incinerated, the pyrolysis gas and pyrolysis oil obtained in this way is sufficient to run the entire incineration in a self-sufficient manner. In this way it no longer relies on fossil energy carriers (oil, gas) for providing the supportive energy.

A further considerable advantage of the method in accordance with the present invention lies in that the heat conveying properties of the "synthetic air" generated in accordance with the present invention and composed of flue gas ($CO_2$) and oxygen are considerably better than those of normal air composed of nitrogen and oxygen. If, for example, the combustion air in the normal case is based on a composition of 75 volume-% of nitrogen, 13.3 volume-% of oxygen and 11.7 volume-% of $H_2O$ and furthermore assumes the density of the components at 1000° C., the result is a volume-specific heat capacity of 0.36 $kJ/m^3.k$. If the "synthetic air" in accordance with the invention is assumed to have 75 volume-% of $CO_2$, 13.3 volume-% of $O_2$ and 11.7 volume-% of $H_2O$, this results in a volume-specific heat capacity of 0.53 $kJ/m^3.k$. Thus, with equal volume throughput and otherwise equal conditions, the heat conveyance of the synthetic air is better by 47% than that of normal air. With air and synthetic air the Prandtl number is below 1, i.e. the spatial extension of the thermal boundary layer is greater than that of the aerodynamic boundary layer, which permits the assumption of a comparable heat transfer of both gas mixtures to, for example, boiler heat transmission surfaces. The represented difference in heat capacity and the increased heat capacity of the synthetic air results in the ability to increase the combustion output by 1.5 times with otherwise the same outlay of an installation. Thus, if existing installations are retrofitted in accordance with the present invention, it is simultaneously possible to increase the output release. This is a further very important advantage of the present invention. If it should be found that in the process the heat transfer is too small because of the "normal" size of the heat transmission surface of the boiler, it is possible to slightly increase the heat transmission surface.

Because of this increase in the heat throughput, the flow speed also changes in comparison with the conventional way of operating. A stable flame at the burner and thus a stable combustion process is assured by regulating the flow speed. For this purpose an advantageous development of the invention provides for the disposition of regulating devices in the line for returning the purified flue gas.

Even with the complete provision of the revolving cylinder with synthetic air of flue gas and oxygen it is still possible that air containing nitrogen is aspirated as "secondary air" into the combustion chamber, for example at the seals of a revolving cylinder. In order to also remove this source for generating $NO_x$ in the course of combustion, an advantageous development of the invention provides for protective devices at the seals, which are supplied with flue gas as the protective gas.

BRIEF DESCRIPTION OF THE DRAWINGS

An exemplary embodiment of the method of the present invention will be described below by means of the attached drawings. Shown are.

DETAILED DESCRIPTION

Figure 1:
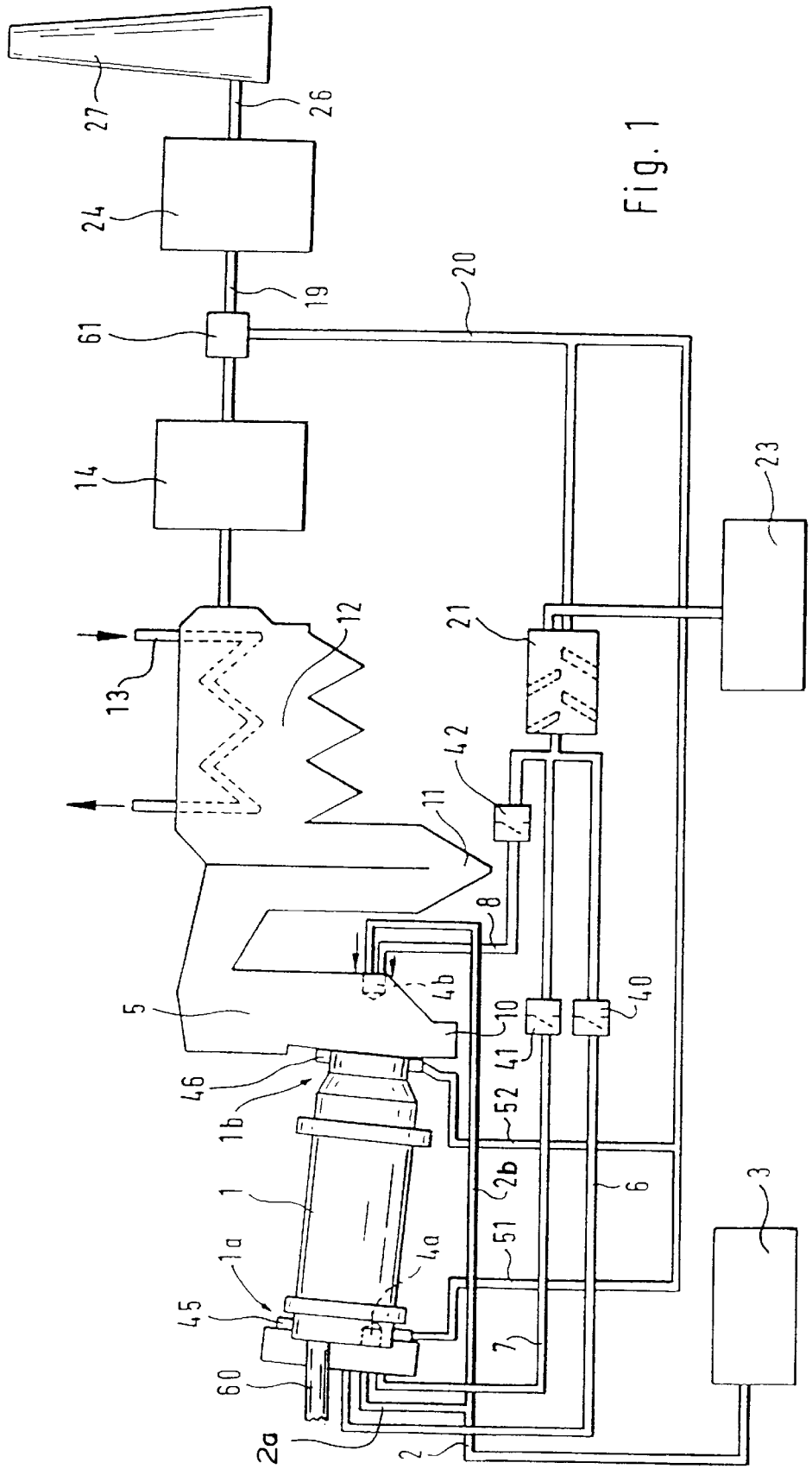
FIG. 1, which illustrates an installation used to practice the method.

Special waste is placed into a revolving cylinder 1, which is used as the combustion chamber, after the portion which could be pyrolyzed had previously been removed. A controllable energy carrier, i.e. a fluid fuel, is supplied via line 2. In this case these can be fossil energy carriers, such as oil or gas. In the process, products of an upstream pyrolysis 3 are employed. Waste rich in heat value (i.e. with an energy content of more than 25 J/kg) from the special waste mixture, such as plastic which can no longer be recycled, electronic scrap or screen overflows or other materials similar to special waste and worth incinerating, such as waste plastic or car tires, are pyrolyzed at 480° to 700° C. in the pyrolysis process. The purified pyrolysis gas and/or the pyrolysis oil are fed into the line 2. The amount of waste which can be pyrolyzed should at least be 40 to 50 of the special waste amount. In this way the combustion in the entire installation is self-sufficient in regard to energy.

The fuel line 2 is branched to form a line 2a leading to a burner 4a in the front end 1a of the revolving cylinder 1, and a line 2b leading to a burner 4b in an afterburner chamber 5. The revolving cylinder 1 is provided with synthetic air via a line 6 terminating in the front end 1a of the revolving cylinder 1, and the burner 4a via a line 7. The synthetic air is generated in a mixing chamber 21, which is supplied on the one hand with flue gas via the line 20, i.e. essentially with $CO_2$, and on the other hand with oxygen generated in an air separating installation 23. This synthetic air is supplied to the end 1a, which in the flow direction is at the front, in the vicinity of the burner 4a to the back end 1b of the revolving cylinder 1. The incineration of the waste, which is supplied to the revolving cylinder 1 by being pumped through a high-pressure line 60 continuously, so to speak, takes place together with the fluid fuel supplied via the line 2 and coming from the pyrolysis 3 and used as a support energy carrier.

The special waste is incinerated in the revolving cylinder 1 and in the process moves from an area of low temperature of approximately 400° to 700° C. at the front end 1a to an area of higher temperature of approximately 1200° to 1300° C. at the back end 1b. Subsequently the flue gas generated during the combustion reaches the already mentioned afterburner chamber 5, in which the burner 4b is disposed, which is supplied with synthetic air via the line 8 and a fluid fuel via the line 2b. After-burning takes place in the afterburner chamber 5. The burnt fusible slag is drawn off at the outlet 10 and is quenched in a water bath (not shown).

From the afterburner chamber 5 the flue gas reaches a radiation part 11, where it is cooled, and from there a waste heat boiler 12 with a convection heat exchanger 13. Here the flue gas is used for the generation of steam, used for current generation (not shown here), while being further cooled.

Subsequently the cooled flue gas, which still has a temperature of between approximately 300° and 400° C., reaches a two-stage flue gas purification installation, whose first stage is indicated by 14 and whose second stage by 24. The removal of dust, chlorine compounds (in particular HCl), sulfur dioxide and heavy metals takes place in the first stage 14 of the flue gas purification installation. In this case the first stage 14 can be embodied as a succession of individual sections to which the individual purification tasks have been assigned. This is known to one skilled in the art. Therefore it is not described in detail in what follows.

A portion of the flue gas purified in the first stage 14 of the flue gas purification installation, which is determined by means of the control flap 61, is returned via the line 20, wherein, as already mentioned, pure oxygen is admixed in the mixing chamber 21 in order to obtain the synthetic air required in the revolving cylinder 1 for incineration.

It should first be assumed in principle that the portion of the returned flue gas corresponds to the portion of nitrogen in normal air (4:1). However, it can be selected to be less in order to create an air number lambda greater than 1 for setting optimal operational conditions by means of this. As already mentioned at the outset, the regulation takes place in such a way that the ratio of flue gas to oxygen downstream of the mixing chamber 21 in the lines 6, 7, 8 varies between 4:1 and 1:1. It preferably lies in the range of 2:1 to 1.5:1.

The result of this flue gas cycle is that the revolving cylinder does not reach temperatures which are too high for conventional combustion technologies, which would be the result of combustion with pure oxygen. On the other hand a large portion of the flue gas being generated during combustion remains in the continuous cycle. It is of importance that within the cycle continuous scrubbing of the noxious emission portions of the flue gas takes place. Purification in the first stage 14 is laid out in such a way that in the cycle there is no enrichment by these portions which—for example in case of HCl—could lead to corrosion of the incineration installation or to an increase in the emission of noxious waste gases in the portion of the flue gas which reaches the outside. This continuous purification of the flue gas in the cycle has the result that the portion of noxious waste gases in the portion of the flue gas which reaches the outside via the line 19 and then, after the second stage 24 of the flue gas purification installation, finally via the stack 27, is already considerably reduced in comparison with conventional installations because as a whole the portion of the flue gas given off in the atmosphere is very much smaller than in the conventional installations. It is possible to reduce the amount of flue gas from approximately $7.5 \times 10^3$ m$^3$ per ton in connection with conventional methods to approximately $1.5 \times 10^3$ m$^3$ per ton of special waste.

A reduction of the nitrogen oxide with this type of incineration of the waste in the revolving cylinder 1 with synthetic air takes place in particular because the synthetic air contains almost no nitrogen, so that nitrogen oxide can no longer be generated in the revolving cylinder 1 by burning the nitrogen in the air.

A portion of the flue gas which is not returned in the line 20 to the continuous flue gas cycle reaches the second stage 24 via the line 19, where the remaining purification of the flue gas takes place, namely in particular regarding the remaining sulfur dioxide and remaining heavy metals. Furthermore, the removal of dioxins and furanes is provided there in appropriate separating installations. It is also possible, if required, that the removal of remaining nitrogen oxides can take place there in case they have still been formed because natural air was aspirated into the system through leaks in the entire system, or while nitrogen compounds were contained in the waste which was incinerated.

As already mentioned at the outset, the incineration output of such a system has been increased by approximately 1.5 times in comparison to conventional installations because of the increased heat capacity of the synthetic air. This increase in the incineration output also leads to a change in the flow speed—in comparison to the dimensions of conventionally laid out incineration installation—which possibly can lead to interruption of the flame of the burner 4a. This can be counteracted by regulating the flow speed in the lines 6, 7, 8. Regulating devices 40, 41, 42 are provided there for this purpose.

To prevent secondary air from being pulled in at the sealing points of the revolving cylinder 1, whose nitrogen portions might result in nitrogen oxide in the flue gas, the seals of the revolving cylinder 1 are provided with chambers 45 at the front end 1a and 46 at the back end 1b, which are also provided with flue gas via lines 51, 52. In these seals this flue gas is used as a protective gas and prevents the aspiration of air containing normal nitrogen.

The pure oxygen which is supplied to the mixing chamber 21 via the line 22 is generated in an air separation installation 23. The nitrogen being generated in the air separation installation 23 can again be used as a protective gas, namely—this would be a modification of the exemplary embodiment shown in the drawings—on the one hand with respect to the sealing of the revolving cylinder system as well as in the comminution installation (not shown), in which special waste is preconditioned and prepared for incineration. In this case the protective gas is used to suppress the generation of explosive mixtures.

Figure 2:
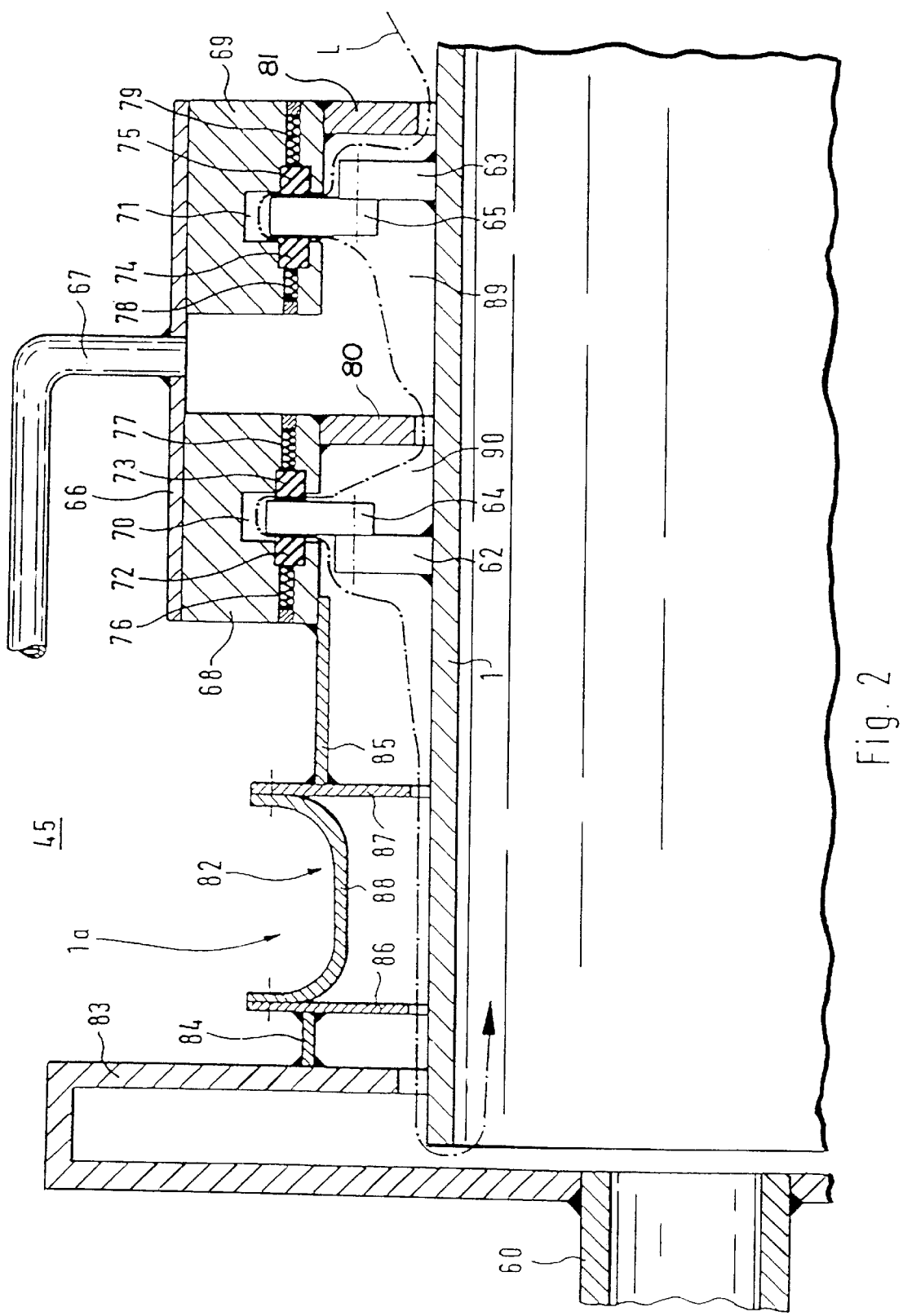
FIG. 2, which is a detail view of the sealing device at the front end of the revolving cylinder, which was only schematically indicated in FIG. 1.

FIG. 2 represents a detailed embodiment of the sealing device 45 on the front end 1a of the revolving cylinder 1. The revolving cylinder 1 is provided with two flanges 62 and 63, to which rings 64 and 65 have been screwed. The screw connection is indicated by dash-dotted lines. The rings 64, 65 are divided for reasons of assembly. The revolving cylinder 1 is enclosed at this point by a stationary ring segment 66 in which the line 67 through which flue gas is supplied terminates. The line 67 in FIG. 2 has the same function as the line 51 in FIG. 1. Two seal support rings 68, 69, U-shaped in cross section, are attached to the ring section 66 and respectively have recesses 70, 71, which are rectangular in cross section and enclose the rings 64, 65. Sealing rings 72, 73 and 74, 75 are received in the lateral faces of the recesses 70, 71. They are pressed against the rings 64, 65, which rotate along with the revolving cylinder 1, by groups of springs 76, 77, 78, 79, and in this way form a sliding ring seal. Further flanges 80, 81 are welded on the seal support rings 68, 69. The seals are so-called "Burgmann seals".

Toward the left in FIG. 2, a compensator 82 adjoins the two Burgmann seals. The compensator 82 is welded to the box 83 which constitutes the front face of the revolving cylindrical kiln. The compensator 82 consists of two ring segments 84, 85, two rings 86, 87, oriented perpendicularly with respect to the axis of the revolving cylinder, and a U-shaped seal support ring 88. The ring section 85 is welded on the inside to the seal supporting ring 68. The compensator 82 is used to compensate for linear changes as a result of heating.

A pressure of approximately minus 4 to 5 mbar obtains in the front (to the left in FIG. 2) end of the revolving cylinder. Since the pressure outside of the revolving cylinder is for example 1000 mbar, there is a considerable pressure difference between the exterior and the interior. In the absence of special measures this would lead to atmospheric air being aspirated into the revolving cylinder 1 along the dash-dotted line L. This would have the result that the nitrogen contained in the aspirated secondary air could form nitrogen oxides in the revolving cylinder. To prevent this, it has been provided that, as mentioned, flue gas which is also at a pressure of 1000 mbar is supplied via the line 67. The flue gas then fills the chambers 89 and 90. This has the result that there is no longer a pressure drop at the place where the sealing ring 75 presses against the ring 65, so that no secondary air can be aspirated along the dash- dotted line L. If, on the other hand, flue gas is aspirated from the chambers 89, 90 into the revolving cylinder through the seal at the ring 64, this can no longer lead to a thermal nitrogen oxide generation, since in the arrangement represented, it no longer contains nitrogen. An effective protective gas seal is therefore achieved in this way.

We claim:

1. A method for reducing emissions during the incineration of waste in an incinerator installation including a combustion chamber, return means downstream of the combustion chamber for returning a portion of a flue gas to the combustion chamber in a continuous cycle, and a flue gas purification installation, the method comprising the steps of:

situating the flue gas purification installation between the combustion chamber and the return means;

producing a flue gas containing dust, chlorine compounds, sulfur dioxide and heavy metals in the course of incineration;

removing a substantial part of the dust, the chlorine compounds, heavy metal and sulfur dioxide from the flue gas in the flue gas purification installation generating thereby a substantially purified flue gas; and admixing a portion of the substantially purified flue gas with pure oxygen to generate synthetic air in the ratio of 4:1 to 1:1, wherein combustion takes place in the combustion chamber using the synthetic air while excluding ambient air.

2. The method as defined in claim 1, further comprising the steps of:

generating the supplied oxygen from air by one of fractional distillation, diaphragm separation and pressure change absorption; and obtaining the energy for said generating step partially from the waste heat of combustion.

3. The method as defined in claim 2, further comprising the steps of:

producing a nitrogen-rich remaining gas from the air used to supply said oxygen during said generating step; and using the nitrogen-rich remaining gas to suppress generation of explosive mixtures.

4. The method as defined in claim 1, further comprising the steps of:

pyrolytically pre-treating the material to be incinerated to produce fuel in the form of one of purified pyrolysis gas and pyrolysis oil; and using said purified pyrolysis gas or pyrolysis oil as fuel.

5. The method as defined in claim 4, wherein the material to be incinerated includes waste material rich in heating values and waste material which cannot be re-processed, and wherein at least one of said waste material rich in heating values and said waste material which cannot be re-processed is pyrolyzed.

6. The method as defined in claim 4, wherein the waste material pyrolyzed is at least 20 to 25% of the waste material to be incinerated.

7. The method as defined in claim 1, wherein the flue gas purification installation includes a second stage, and wherein the flue gas is cleaned of dioxins, furanes, sulfur dioxide, heavy metals and nitrogen oxides in the second stage.

8. The method as defined in claim 1, further comprising the step of:

returning a portion of said flue gas as said generated synthetic air to the combustion chamber, wherein as a result of returning a portion of the flue gas as said generated synthetic air to the combustion chamber, the volume-specific heating capacity of the flue gas is increased up to 1.5 times, and wherein the volume-specific outlet release is increased up to 1.5 times.

9. An installation for reducing emissions during the incineration of waste, comprising:

a source of pure oxygen;

a combustion chamber;

a diverting device disposed downstream of said combustion chamber in the direction of flow for diverting a portion of a flowing flue gas containing dust, chlorine compounds, sulfur dioxide and heavy metals;

a flue gas purification installation located between said combustion chamber and said diverting device for removing a substantial portion of the dust, chlorine compounds, heavy metals and sulfur dioxide from the flue gas generating thereby a substantially purified flue gas;

a mixing chamber located downstream of said diverting device in the direction of flow back to said combustion chamber for admixing a portion of the substantially purified flue gas with pure oxygen from said pure oxygen source, to generate synthetic air; and at least two lines connected from said mixing chamber to different locations in said combustion chamber, each line including a control device for controlling the flow of synthetic air from said mixing chamber to said combustion chamber for controlling thereby the flow speed of the flue gas in said combustion chamber.

10. The installation as defined in claim 9, wherein said control devices are throttle devices.

11. The installation as defined in claim 9, wherein said combustion chamber includes inlet and outlet seal portions, further comprising:

a protective device provided at said inlet and outlet seal portions of said combustion chamber, said protective devices having a flue gas as a protective gas against the aspiration of secondary air.

12. The installation as defined in claim 11, wherein one of said protective devices comprises two spaced apart rings flanged to said combustion chamber, a sealing support ring associated with each spaced apart ring, each sealing support ring including sealing rings in engagement with its respective spaced apart ring, said sealing rings being held stationary against its respective spaced apart ring, and wherein a chamber is defined between said spaced apart rings into which flue gas is supplied.

13. The installation as defined in claim 12, further comprising means for supplying flue gas under pressure to said chamber equal to the pressure outside of said combustion chamber.

14. The method as defined in claim 1, wherein the ratio of the synthetic air generated is 2:1 to 1.5:1.

15. The installation as defined in claim 9, further comprising:

an air separating installation connected to said mixing chamber, said air separating installation separating air delivered to said mixing chamber.

* * * * *